(12) United States Patent
Yan et al.

(10) Patent No.: US 10,205,621 B2
(45) Date of Patent: Feb. 12, 2019

(54) DIFFERENTIAL SIGNAL MAPPING FOR CELL-EDGE AND CELL-CENTER USER EQUIPMENTS

(71) Applicant: NTT DoCoMo, Inc., Chiyoda-ku, Tokyo (JP)

(72) Inventors: Chunlin Yan, Beijing (CN); Anass Benjebbour, Beijing (CN); Yang Lan, Beijing (CN); Anxin Li, Beijing (CN); Huiling Jiang, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 92 days.

(21) Appl. No.: 14/813,920

(22) Filed: Jul. 30, 2015

(65) Prior Publication Data
US 2016/0036619 A1   Feb. 4, 2016

(30) Foreign Application Priority Data

Aug. 1, 2014 (CN) .......................... 2014 1 0378348

(51) Int. Cl.
  *H04L 27/34* (2006.01)
  *H04L 5/00* (2006.01)
  *H04W 72/04* (2009.01)

(52) U.S. Cl.
  CPC ........ *H04L 27/3483* (2013.01); *H04L 5/0037* (2013.01); *H04L 5/0069* (2013.01);
  (Continued)

(58) Field of Classification Search
  CPC . H04L 27/3483; H04L 5/0037; H04L 5/0069; H04L 5/0007; H04W 72/042; H04W 72/0453
  See application file for complete search history.

(56) References Cited

U.S. PATENT DOCUMENTS

2007/0286238 A1* 12/2007 Wang ........................ H04L 5/04
  370/478
2010/0046644 A1   2/2010 Mazet
(Continued)

FOREIGN PATENT DOCUMENTS

| EP | 2 154 856 A1 | 2/2010 | |
|---|---|---|---|
| JP | WO 2012161080 A1 * | 11/2012 | .......... H04W 72/082 |
| WO | WO 2010017638 A1 * | 2/2010 | ............... H04L 5/04 |

OTHER PUBLICATIONS

Extended Search Report, European Patent Application No. 15177309.0, dated Dec. 16, 2015.
(Continued)

*Primary Examiner* — Ricky Q Ngo
*Assistant Examiner* — Stephen N Steiner
(74) *Attorney, Agent, or Firm* — Harness, Dickey & Pierce, P.L.C.

(57) ABSTRACT

A transmitting apparatus and a transmitting method are provided. The transmitting apparatus comprises: an encoder configured to encode data for a plurality of user equipments into corresponding encoded signals, respectively; a modulator configured to perform a joint modulation on the encoded signals for the plurality of user equipments to generate modulated signals, wherein the modulator performs the joint modulation by mapping bits of the encoded signals for the plurality of user equipments to a symbol corresponding to each constellation point of a constellation map of the modulated signals so that respective constellation points satisfy a Gray mapping rule; a transmitter configured to transmit the modulated signals.

16 Claims, 6 Drawing Sheets

(52) U.S. Cl.
CPC ....... *H04L 27/3488* (2013.01); *H04W 72/042* (2013.01); *H04W 72/0453* (2013.01); *H04L 5/0007* (2013.01)

(56) References Cited

U.S. PATENT DOCUMENTS

| | | | | |
|---|---|---|---|---|
| 2010/0303004 A1* | 12/2010 | Mueck | ................ | H04L 1/0625 370/328 |
| 2011/0228869 A1* | 9/2011 | Barsoum | ............... | H04L 1/0003 375/261 |
| 2012/0189082 A1* | 7/2012 | Zhang | ................ | H04B 7/0452 375/299 |
| 2014/0029562 A1* | 1/2014 | Kishiyama | .......... | H04W 72/082 370/329 |

OTHER PUBLICATIONS

European Office Action regarding related application EP 15177309.0, EPO, Rijswick, NL, dated Sep. 25, 2018.

* cited by examiner

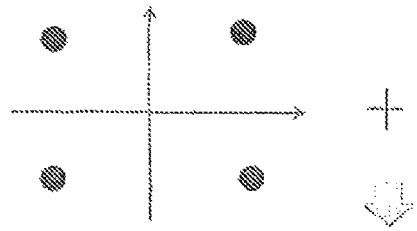
FIG. 4(a)
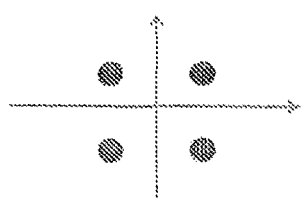
FIG. 4(b)
FIG. 4(c)
} FIG. 4
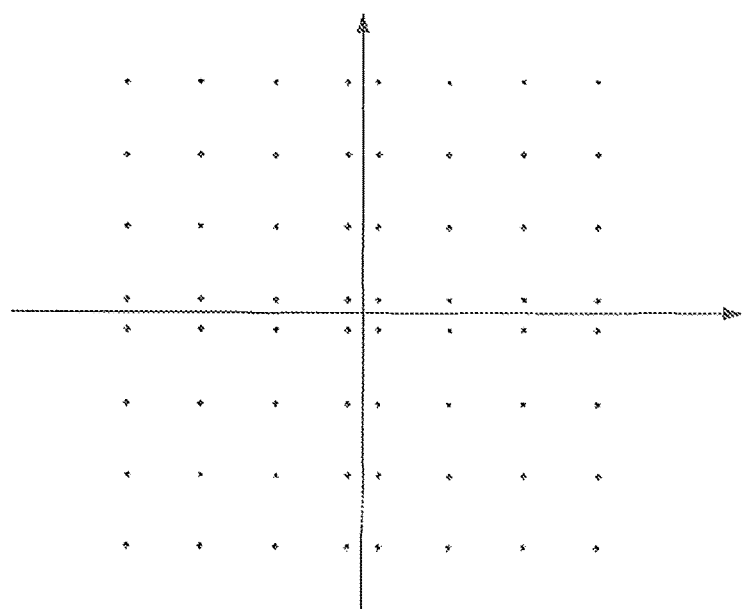
FIG. 5

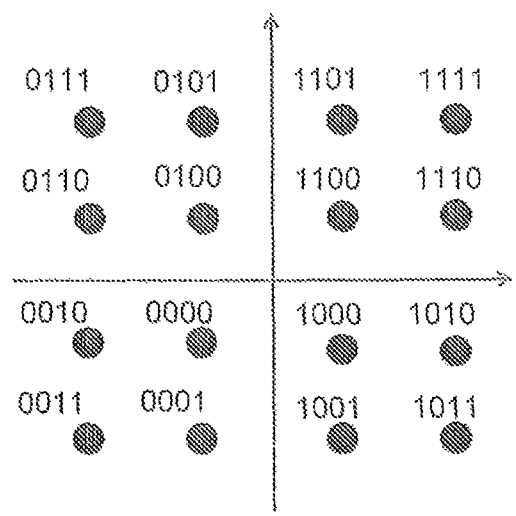
FIG. 8
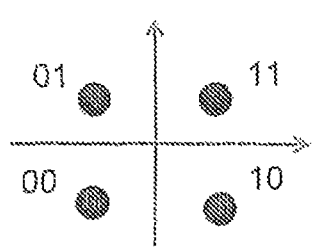
FIG. 9(a)
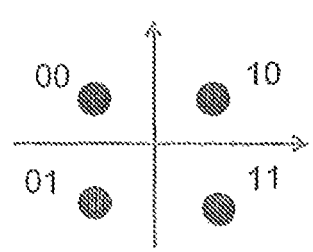
FIG. 9(b)
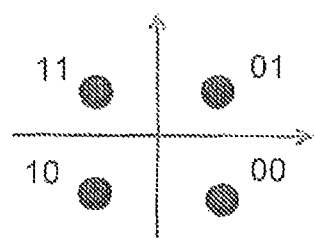
FIG. 9(c)
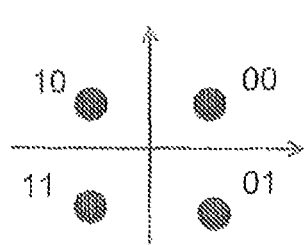
FIG. 9(d)
FIG. 9

DIFFERENTIAL SIGNAL MAPPING FOR CELL-EDGE AND CELL-CENTER USER EQUIPMENTS

CROSS-REFERENCE TO RELATED APPLICATIONS

This application claims priority to Chinese Patent Application No. 201410378348.4 with a title of "TRANSMITTING APPARATUS AND TRANSMITTING METHOD" filed with the Chinese Patent Office on Aug. 1, 2014, the entire contents of which are being incorporated herein by reference.

TECHNICAL FIELD

The present disclosure relates to a field of wireless communication, and more specifically, to a transmitting apparatus and a transmitting method that can be used in a wireless communication system (especially a Non-Orthogonal Multiple Access (NOMA) wireless communication system).

BACKGROUND

A Non-Orthogonal Multiple Access (NOMA) wireless communication technology is a new wireless access technology proposed in Long Term Evolution (LTE) release 13 of the 3rd Generation Partnership Project (3GPP) research. As shown in FIG. 1, in a NOMA system, data for a plurality of user equipments (UEs) can be multiplexed in each frequency resource block (e.g., a frequency sub-band) to improve throughput of the system, where the data for respective UEs that are multiplexed in each frequency resource block are distinguished by using different powers and successive interference cancellation (SIC) orders; and the SIC order indicates an order in which the data for the respective UEs that are multiplexed in each frequency resource block are demodulated.

In a traditional NOMA system, at a transmitter side (e.g., in a base station), the data for the plurality of UEs to be multiplexed in a frequency resource block are respectively modulated after being encoded to generate modulated signals for the respective UEs, and then the modulated signals for the respective UEs are superposed according to the powers assigned to the respective UEs to generate a composite signal, which is sent to the receiver after various processes (e.g., an inverse fast Fourier transform, an addition of cyclic prefix, and so on). However, when decoding required signals, a UE in a center of a cell needs to firstly detect signals of UEs on an edge of the cell, and then detect signals of its own only after performing interference cancellation on the signals of the UEs on the edge of the cell, which causes a high complexity of the receiver.

SUMMARY OF THE INVENTION

One objective of the present disclosure is to provide a transmitting apparatus and a transmitting method that can be used in a wireless communication system (especially a Non-Orthogonal Multiple Access (NOMA) wireless communication system), which can modulate encoded signals for a plurality of UEs in a new manner such that it is not necessary to perform interference cancellation when the signals for the UE in the center of a cell are decoded at a receiver side, thus reducing the complexity of the receiver.

According to one aspect of the present disclosure, a transmitting apparatus is provided. The transmitting apparatus comprises: an encoder, configured to encode data for a plurality of user equipments into corresponding encoded signals, respectively; a modulator, configured to perform a joint modulation to the encoded signals for the plurality of user equipments to generate modulated signals, wherein the modulator performs the joint modulation by mapping bits of the encoded signals for the plurality of user equipments to a symbol corresponding to each constellation point of a constellation map of the modulated signals so that respective constellation points of the constellation map satisfy the Gray mapping rule; and a transmitter, configured to transmit the modulated signals.

According to another aspect of the present disclosure, a transmitting method is provided. The transmitting method comprises: encoding data for a plurality of user equipments into corresponding encoded signals, respectively; performing a joint modulation on the encoded signals for the plurality of user equipments to generate modulated signals, wherein the joint modulation is performed by mapping bits of the encoded signals for the plurality of user equipments to a symbol corresponding to each constellation point of a constellation map of the modulated signals so that respective constellation points satisfy the Gray mapping rule; and transmitting the modulated signals.

By means of the transmitting apparatus and transmitting method, the encoded signals for a plurality of UEs that are multiplexed to each frequency resource block (e.g., a frequency sub-band) can be jointly modulated rather than separately modulated, such that respective constellation points of a constellation map of the obtained modulated signals satisfy the Gray mapping rule. That is, the number of different bits between bits mapped to the symbols corresponding to any two adjacent constellation points of the constellation map is 1. As such, it is not necessary to firstly demodulate the signals of the UEs located on the edge of the cell and perform interference cancellation on the signals when the signals of the UE in the center of the cell are demodulated, thus reducing the complexity of the receiver.

BRIEF DESCRIPTION OF THE DRAWINGS

The above and other objectives, features, advantages of the present disclosure will become more apparent from the specific description of the embodiments of the present disclosure in conjunction with the drawings, in which, same reference signs always indicate same elements, wherein:

FIGS. 4(a)-(c) (collectively, FIG. 4) illustrate examples of determined positions of constellation points of a constellation map of the modulated signals in a case that only the data for two UEs are multiplexed in a frequency sub-band.

FIG. 5 illustrates an example of an irregular constellation map.

FIG. 8 illustrates another example of a constellation map of modulated signals obtained in the case that the data for two UEs are multiplexed in the frequency sub-band.

FIGS. 9(a)-(d) (collectively, FIG. 9) illustrate a way of mapping bits of modulated signals for $UE_2$ when the bits of the modulated signals for $UE_1$ are 00, 01, 10 and 11.

FIG. 10 illustrates an example of a constellation map of modulated signals obtained in the way as shown in FIG. 9.

FIG. 11 illustrates an example of a constellation map where six bits are mapped to the symbol corresponding to each constellation point of the constellation map of the modulated signals.

DESCRIPTION OF THE EMBODIMENTS

The transmitting apparatus and the transmitting method according to the embodiments of the present disclosure will be described now with reference to the drawings.

Figure 2:
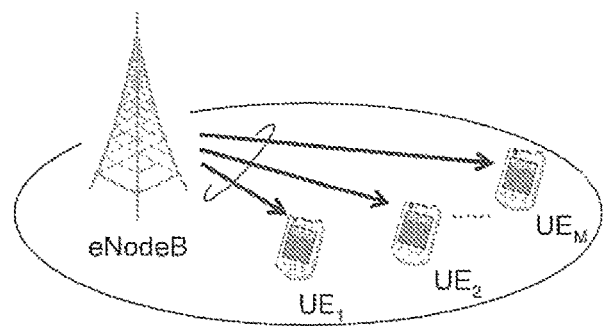
FIG. 2 is a diagram illustrating an exemplary wireless communication system which can use a transmitting apparatus and a transmitting method according to embodiments of the present disclosure.

FIG. 2 schematically illustrates a wireless communication system which can use the transmitting apparatus and transmitting method according to the embodiments of the present disclosure. As shown in FIG. 2, the wireless communication system may include a base station (eNodeB) and M (M≥2) UEs, i.e., $UE_1$, $UE_2$, . . . $UE_M$, which communicate with the base station. The base station can be connected with an upper-layer device (not shown), and the upper-layer device may be further connected to a core network (not shown). As used herein, the UE may include various types of user terminals, such as mobile terminal (or mobile station) or fixed terminal. The wireless communication system may be a NOMA wireless communication system, or may be any other type of wireless communication system. Hereinafter, the embodiments of the present disclosure will be described by taking a NOMA wireless communication system as an example, in which case, the base station may multiplex the data for a plurality of UEs to each frequency resource block. The frequency resource block may be a frequency sub-band or any other type of resource block. The embodiments of the present disclosure will be described by taking a frequency sub-band being the frequency resource block as an example hereinafter.

Figure 3:
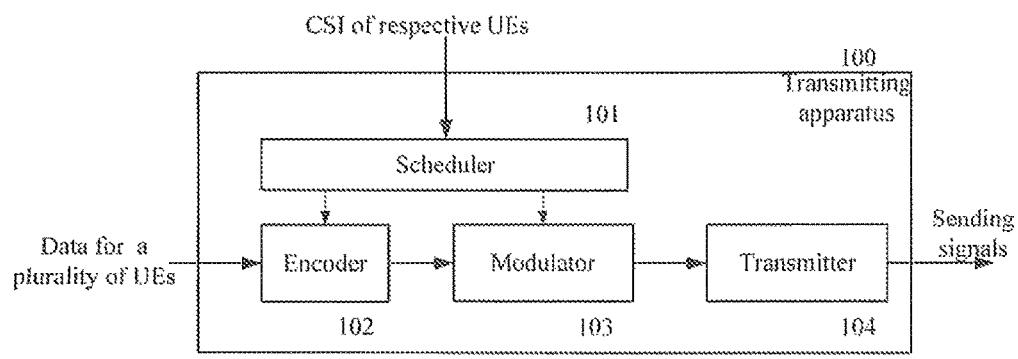
FIG. 3 is a block diagram illustrating a transmitting apparatus according to an embodiment of the present disclosure.

FIG. 3 schematically illustrates a block diagram of a transmitting apparatus according to an embodiment of the present disclosure. In this embodiment, the transmitting apparatus is located in the base station shown in FIG. 2, and thus is a part of the base station. In this case, in addition to the transmitting apparatus, the base station may further include other parts that can be used to implement communication with the UE and/or the upper-layer device. Since these parts are irrelevant of the embodiment of the present disclosure, they are not shown or depicted herein. In other embodiments, the transmitting apparatus is operatively connected to the base station, and is controlled by the base station to carry out operations described as follows.

As shown in FIG. 3, a transmitting apparatus 100 may include a scheduler 101, an encoder 102, a modulator 103 and a transmitter 104. It should be appreciated that although the scheduler 101 in this embodiment is shown to be included in the transmitting apparatus 100, the scheduler 101 may be located outside the transmitting apparatus 100 in the base station in other embodiments, and may be communicatively connected to the transmitting apparatus 100 so as to provide related information to the transmitting apparatus 100. In other words, the scheduler 101 may not be a part of the transmitting apparatus 100.

The scheduler 101 may schedule a plurality of UEs for each frequency sub-band to determine data for which UEs are multiplexed to the frequency sub-band. Therefore, channel status information (CSI) reflecting a wireless channel condition between a UE and a base station, for example, a channel quality indicator (CQI), may be fed back to the base station from each UE such that the scheduler 101 can perform the above scheduling on respective UEs according to the CSI fed back by each UE. Moreover, based on the CSI fed back by respective UEs, the scheduler 101 may further determine a demodulation order (i.e., the successive interference cancellation (SIC) order of the respective UEs) of the data for the respective UEs that are multiplexed in each frequency sub-band and the powers and modulation and coding schemes (MCS) assigned to the respective UEs. The methods for the scheduler 101 to perform the above scheduling of UEs according to CSI and determine the SIC order, powers and MCSs of the respective UEs according to CSI are known in the art, and thus will not be described herein. In addition, unless otherwise specified, the description hereinafter only involves one frequency sub-band, but such description is actually applicable to each frequency sub-band.

The encoder 102 can encode the data for the plurality of UEs to corresponding encoded signals, respectively. For example, the encoder 102 can encode the data for the respective UEs by using an encoding method known in the art according to the MCSs assigned to the respective UEs, to generate encoded signals for the respective UEs. It should be noted that although only one encoder 102 is shown in FIG. 2, a plurality of encoders may be provided, and each encoder encodes the data for one UE to corresponding encoded signals.

The modulator 103 can perform a joint modulation on the encoded signals for the plurality of UEs to generate modulated signals. In the embodiment of the present disclosure, the modulator 103 can perform the joint modulation by mapping bits of the encoded signals for the plurality of user equipments to a symbol corresponding to each constellation point of a constellation map of the modulated signals so that respective constellation points satisfy the Gray mapping rule. As described above, the Gray mapping rule means that the number of different bits between bits mapped to the symbols corresponding to any two adjacent constellation points of the constellation map is 1.

Specifically, as described above, the scheduler 101 can determine the data for which UEs are multiplexed on each frequency sub-band and the MCS assigned to each UE. The modulator 103 can determine the number of the bits of the encoded signals for the UE that are mapped to the symbol corresponding to each constellation point of the constellation map of the modulated signals according to the MCS assigned to each UE. More specifically, the modulator 103 can determine the number of the bits of the encoded signals for the UE that are mapped to the symbol corresponding to each constellation point of the constellation map of the modulated signals according to the modulation scheme indicated by the MCS assigned to each UE. For example, if the modulation scheme indicated by the MCS assigned to the UE is 4QAM or QPSK, it can be determined that the number of the bits of the encoded signals for the UE that are mapped to the symbol corresponding to each constellation point of the constellation map of the modulated signals is 2; if the modulation scheme indicated by the MCS assigned to the UE is 16QAM, it can be determined that the number of the bits of the encoded signals for the UE that are mapped to the symbol corresponding to each constellation point of the constellation map of the modulated signals is 4; if the modulation scheme indicated by the MCS assigned to the UE is 64QAM, it can be determined that the number of the bits of the encoded signals for the UE that are mapped to the symbol corresponding to each constellation point of the constellation map of the modulated signals is 6.

Then, the modulator 103 can determine a position of each constellation point of the constellation map of the modulated signals according to the powers assigned to the plurality of UEs and the above numbers of bits (i.e., the numbers of bits of the encoded signals for the respective UEs that are mapped to the symbol corresponding to each constellation point of the constellation map of the modulated signals).

Specifically, firstly, the modulator 103 can calculate a sum of the numbers of bits of the encoded signals for the respective UEs that are mapped to the symbol corresponding to each constellation point of the constellation map of the modulated signals, to determine a total number N of the bits mapped to the symbol corresponding to each constellation point, so as to determine a number ($2^N$) of the constellation points of the constellation map of the modulated signals. For example, if data for two UEs are multiplexed in the frequency sub-band, and the total number N of the bits of the encoded signals for the two UEs that are mapped to the symbol corresponding to each constellation point of the constellation map of the modulated signals is 4, it can be determined that the number of the constellation points of the constellation map of the modulated signals is 16; if the total number N of the bits that are mapped to the symbol corresponding to each constellation point of the constellation map of the modulated signals is 6, it can be determined that the number of the constellation points of the constellation map of the modulated signals is 64.

Then, the modulator 103 can determine positions of respective constellation points in the constellation map according to the powers assigned to the respective UEs and the determined number of constellation points. Specifically, the modulator 103 can determine the positions of the respective constellation points in the constellation map based on the modulation schemes of the respective UEs in a descending order of powers assigned to the UEs. For example, the modulator 103 can firstly determine positions of $N_1$ constellation points (referred to as first temporary constellation points hereinafter) corresponding to a modulation scheme (i.e., the modulation scheme indicated by the MCS assigned to the UE) of a first UE (the UE to which the largest power is assigned) in the constellation map, where the position of each first temporary constellation point relative to an origin of the constellation map depends on the power assigned to the first UE. For example, if the modulation scheme of the first UE is QPSK, it can be determined that $N_1$=4 first temporary constellation points, and coordinates of the four first temporary constellation points are ($\pm\sqrt{P_1/2},\pm\sqrt{P_1/2}$), where $P_1$ is the power assigned to the first UE. Then, the modulator 103 can determine positions of $N_2$ constellation points (referred to as second temporary constellation points hereinafter) corresponding to a modulation scheme of a second UE (the UE to which the second largest power is assigned) by taking each first temporary constellation point as an origin, thereby determining the positions of total $N_1 \times N_2$ second temporary constellation points, where the positions of $N_2$ second temporary constellation points relative to the first temporary constellation point determined based on each first temporary constellation point depends on the power assigned to the second UE. For example, if the modulation scheme of the second UE is 16QAM, $N_2$=16 second temporary constellation points can be determined based on each first temporary constellation point, and these 16 temporary constellation points are evenly distributed in a square region with the corresponding first temporary constellation point as a center and $\sqrt{2P_2}$ as a side length, where $P_2$ is the power assigned to the second UE, and 64 constellation points are determined in total. In a similar manner, the modulator 103 can determine positions of respective temporary constellation points corresponding to a current UE in sequence by taking each temporary constellation point determined for a previous UE as an origin according to a modulation scheme of each of the remaining UEs, and use the positions of all temporary constellation points determined according to a modulation scheme of a last UE (the UE to which the smallest power is assigned) as the positions of the constellation points of the constellation map of the modulated signals. FIG. 4 illustrates an example of determined positions of respective constellation points in the constellation map in a case that only the data for two UEs are multiplexed in a frequency sub-band according to the powers assigned to the two UEs and the number of bits of the encoded signals for the two UEs that are mapped to the symbol corresponding to each constellation point of the constellation map of the modulated signals. In this example, it is assumed that the modulations schemes of the first UE on the edge of the cell and the second UE in the center of the cell are both QPSK, and the power assigned to the first UE is greater than that assigned to the second UE, then their constellation maps are as shown in FIGS. 4(a) and 4(b), respectively, and the constellation map of the modulated signals obtained by performing the joint modulation on the encoded signals for the two UEs can be determined according to the above method. As shown in FIG. 4(c), this constellation map has 16 constellation points, wherein a symbol s corresponding to each constellation point may be expressed as $\sqrt{P_1/2}s_1+\sqrt{P_2/2}s_2$, where $s_1$ and $s_2$ are a symbol of the first UE and a symbol of the second UE, respectively.

It should be noted that since the positions of the constellation points of the constellation map are related with the powers assigned to the respective UEs, the constellation map may be a regular constellation map with respective constellation points evenly distributed, or an irregular constellation map with respective constellation points unevenly distributed, as the powers assigned to the respective UEs vary. For example, in the case that data for two UEs are multiplexed in the frequency sub-band, if a ratio of the power $P_1$ assigned to the UE located on the edge of the cell to the power $P_2$ assigned to the UE in the center of the cell is 0.8:0.2, and the modulation schemes of the two UEs are both QPSK modulation, then the constellation map determined in the above way is the same with the constellation map of 16QAM, i.e., a regular constellation map; on the other hand, if $P_1:P_2$=0.7:0.3, and the modulation scheme of the UE on the edge of the cell is QPSK modulation and the modulation scheme of the UE in the center of the cell is 16QAM modulation, then the constellation map determined in the above way is an irregular constellation map, as shown in FIG. 5.

After the positions of the respective constellation points of the constellation map of the modulated signals are determined, the modulator 103 may map the bits of the encoded signals for the plurality of UEs to the symbol corresponding to each constellation point such that the respective constellation points of the constellation map satisfy the Gray mapping rule. In this embodiment, in the case that only the data for two UEs are multiplexed, the modulator 103 may map bits of the encoded signals of the UE on the edge of the cell to high significant bits of a symbol corresponding to each constellation point and map bits of the encoded signals of the UE in the center of the cell to low significant bits of the symbol. In the case that the data for more than two UEs are multiplexed, the modulator 103 can map the bits of the encoded signals for respective UEs to the symbol according to the SIC order of the respective UEs, starting from the high significant bit of the symbol corresponding to each constellation point.

The modulator 103 may perform the above mapping of the bits to the symbol in many ways. In a first mapping manner, the modulator 103 map bits of the encoded signals for the plurality of UEs to a symbol corresponding to each constellation point of the constellation map according to a mapping table, which indicates a mapping relationship between the bits of the encoded signals for the plurality of UEs and the symbol corresponding to each constellation point of the constellation map. The mapping table may be predefined and stored in the base station and each UE. Among the bits of each unit grid in the mapping table, the bits of the encoded signal for the UE on the edge of the cell may be located in the high significant bits, while the bits of the encoded signal for the UE in the center of the cell may be located in the low significant bits. For example, when the data for $UE_1$ (on the edge of the cell) and $UE_2$ (in the center of the cell) are multiplexed in the frequency sub-band, and the numbers of bits of the encoded signals for the two UEs that are mapped to the symbol corresponding to each constellation point of the constellation map of the modulated signals are 2 and 2 respectively, the modulated signals will have 16 constellation points, so a mapping table as shown in Table 1 below can be predefined and stored in the base station and each UE:

TABLE 1

| 0101 | 0100 | 0000 | 0001 |
| 0111 | 0110 | 0010 | 0011 |
| 1111 | 1110 | 1010 | 1011 |
| 1101 | 1100 | 1000 | 1001 |

Figure 1:
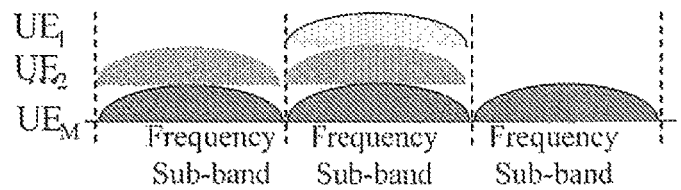
FIG. 1 is a diagram schematically illustrating a way of multiplexing data for a plurality of UEs in a Non-Orthogonal Multiple Access (NOMA) system.
Figure 6:
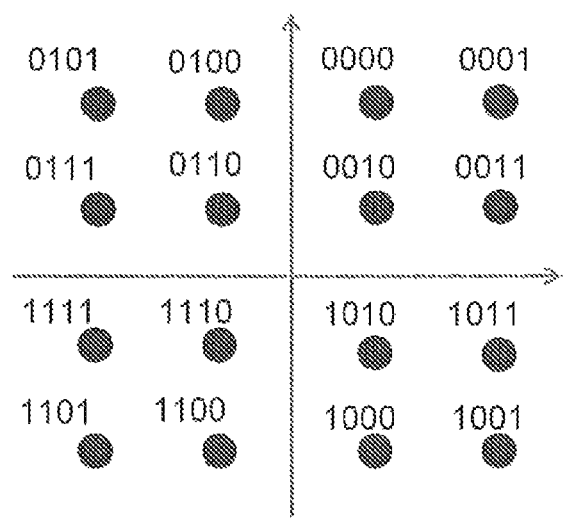
FIG. 6 illustrates an example of a constellation map obtained by mapping the bits of the encoded signals for two UEs to the symbol corresponding to each constellation point shown in FIG. 4(C) according to a mapping table.

Each unit grid in Table 1 corresponds to one constellation point. It can be seen that the number of different bits between any two adjacent unit grids in the mapping table as shown in FIG. 1 is 1, which indicates that respective constellation points of the constellation map of the modulated signals obtained according to this mapping table satisfy the Gray mapping rule. In addition, among the bits of each unit grid, the bits of the encoded signal for the $UE_1$ on the edge of the cell are located in the first two bits (high significant bits), while the bits of the encoded signal for the $UE_2$ in the center of the cell are located in the last two bits (low significant bits). The modulator 103 can map the bits of the encoded signals for the two UEs to the symbol corresponding to each constellation point of the constellation map according to the mapping relationship defined in the mapping table, such that respective constellation points satisfy the Gray mapping rule. FIG. 6 illustrates a constellation map obtained by mapping the bits of the encoded signals for the two UEs to the symbol corresponding to each constellation point in the example shown in FIG. 4(C) according to this mapping table. It should be noted that since an arrangement manner of the constellation points satisfying the Gray mapping rule is not unique, the above predefined mapping table is not unique either, and is only used as an example.

Figure 7:
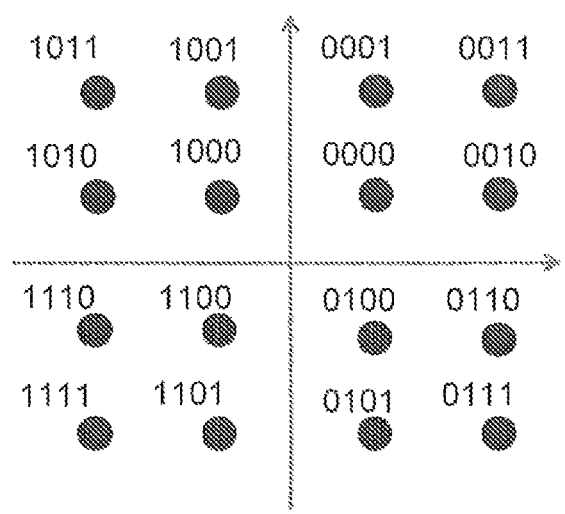
FIG. 7 illustrates an example of a constellation map of modulated signals obtained in the case that the data for two UEs are multiplexed in the frequency sub-band.

In a second mapping manner, the mapping table may not be set, but the bits of the encoded signals for the plurality of UEs can be directly mapped to the symbol corresponding to each constellation point of the constellation map according to a mapping manner both known to the base station and each UE, so that respective constellation points satisfy the Gray mapping rule. FIG. 7 and FIG. 8 illustrates examples of the constellation maps obtained by not using any mapping table when the data for two UEs are multiplexed in the frequency sub-band, and the numbers of bits of the encoded signals for the two UEs that are mapped to the symbol corresponding to each constellation point of the constellation map of the modulated signals are 2 and 2 respectively.

In a third mapping manner, for the symbol corresponding to each constellation point of the constellation map, the modulator 103 can determine the bits of the encoded signals for the UE on the edge of the cell that are mapped to the symbol, and then determine the bits of the encoded signals for the UE in the center of the cell that are mapped to the symbol according to the bits of the encoded signals for the UE on the edge of the cell that are mapped to the symbol. In other words, the modulator 103 can map the bits of the encoded signals for respective UEs to the symbol corresponding to each constellation point in sequence according to the SIC order, the bits of the encoded signals of the UE needing not to perform SIC are mapped to the high significant bits of the symbol, while the bits of the encoded signals of the UE needing not to perform SIC are mapped to the low significant bits of the symbol. By taking the case of two UEs as an example, it assumes that $UE_1$ is on the edge of the cell, $UE_2$ is in the center of the cell, and the numbers of bits of the encoded signals for the two UEs that are mapped to the symbol corresponding to each constellation point of the constellation map of the modulated signals are 2 and 2 respectively, then the mapping rules below may be preset in the base station and the UEs: when the bits of the modulated signals for $UE_1$ are 00, 01, 10 and 11, the bits of the modulated signals for $UE_2$ are mapped respectively in the manners as shown in FIGS. 9(a), 9(b), 9(c) and 9(d). When the joint modulation is carried out, the modulator 103 can map the bits of the encoded signals for $UE_1$ to the high significant bits (the first two bits in this example) of a symbol corresponding to constellation points in respective quadrants of the constellation map in any method known in the art. For example, when the bits of the modulated signals for $UE_1$ is 00, the bits can be mapped to the first two bits of the symbol corresponding to respective constellation points in a first quadrant; when the bits of the modulated signals for $UE_1$ is 10, the bits can be mapped to the first two bits of the symbol corresponding to respective constellation points in a second quadrant; when the bits of the modulated signals for $UE_1$ is 11, the bits can be mapped to the first two bits of the symbol corresponding to respective constellation points in a third quadrant; and when the bits of the modulated signals for $UE_1$ is 01, the bits can be mapped to the first two bits of the symbol corresponding to respective constellation points in a fourth quadrant. Then, the modulator 103 can determine the bits of the encoded signals for $UE_2$ that are mapped to the symbol according to the bits of the encoded signals for $UE_1$ that are mapped to the symbol based on the above mapping rules, so as to obtain the constellation map shown in FIG. 10. Obviously, respective constellation points of the constellation map satisfy the Gray mapping rule. Similarly, since the arrangement manner of the constellation points satisfying the Gray mapping rule is not unique, the above mapping rules are not unique either, but only used as an example.

In the above manners, the modulator 103 can perform a joint modulation on the encoded signals for the plurality of UEs, and make respective constellation points of the obtained constellation map of the modulated signals satisfy the Gray mapping rule.

Figures 10, 11:
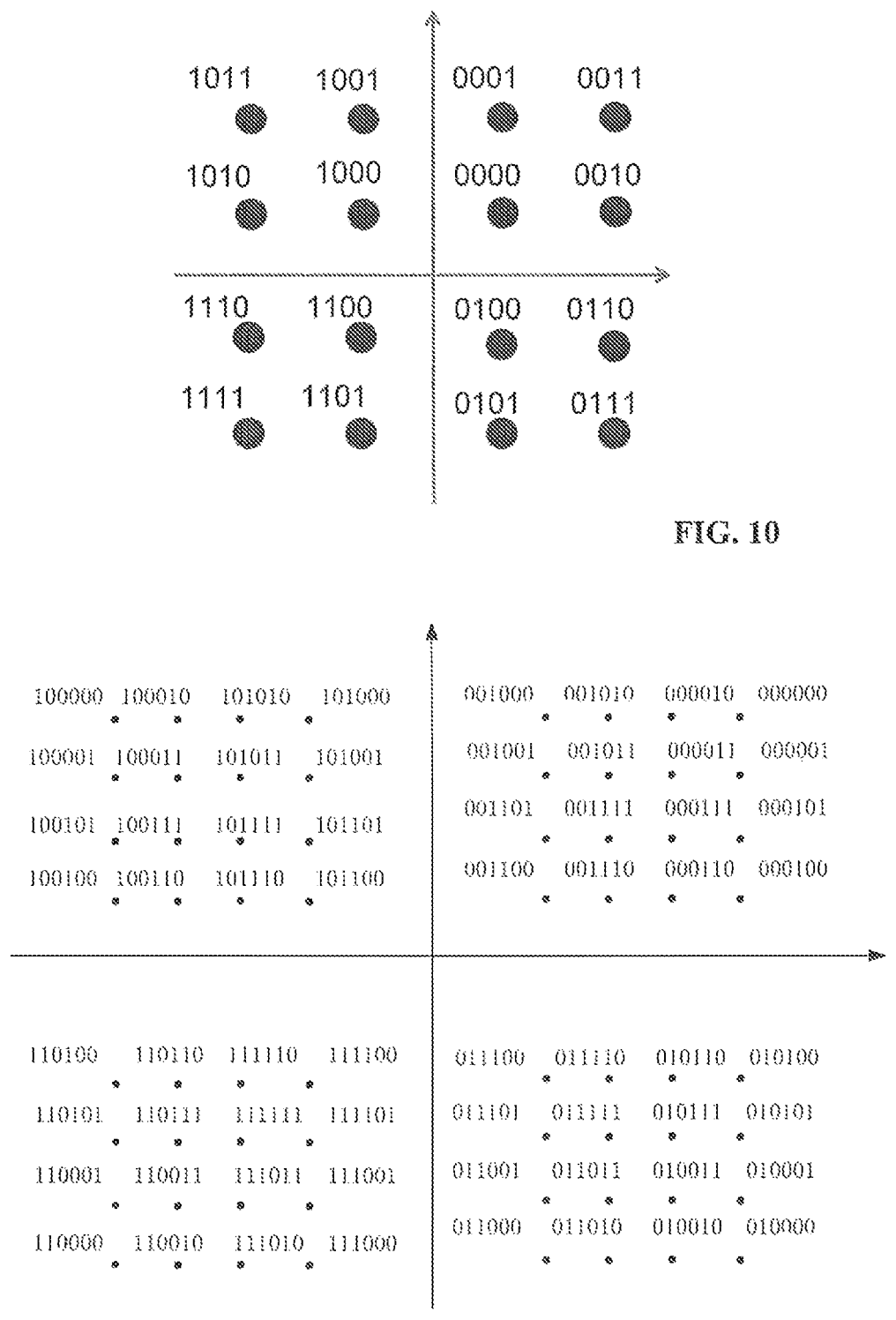

As described above, the above description is only directed to the case of one frequency sub-band. In a case that there are a plurality of frequency sub-bands, the modulator 103 performs the above operation on each frequency sub-band so as to perform the above joint modulation on the data of the UE multiplexed to the frequency sub-bands. In this case, there may be the case where the data for the same UE are multiplexed to a plurality of frequency sub-bands. In this case, for different frequency sub-bands, the numbers of bits for the same UE that are mapped to the symbol corresponding to each constellation point of the obtained constellation map of the modulated signals corresponding to the frequency sub-bands may be same or different. For example, for a first frequency sub-band, the number of the bits for a certain UE that are mapped to the symbol corresponding to each constellation point of the corresponding modulated signals may be 2; and for a second frequency sub-band, the number of the bits for the certain UE that are mapped to the symbol corresponding to each constellation point of the corresponding modulated signals may be 4. In addition, since the numbers of multiplexed UEs in different frequency sub-bands may be same or different, for example, the data of two UEs are multiplexed in the first frequency sub-band, while the data of three UEs are multiplexed in the second frequency sub-band. Therefore, for different frequency sub-bands, the constellation maps of respective modulated signals generated by the modulator 103 may be same or different. FIG. 11 illustrates an example of a constellation map where six bits are mapped to the symbol corresponding to each constellation point of the constellation map of the modulated signals. In one frequency sub-band, four bits out of the six bits may be from the encoded signals for the first UE, and the remaining two bits may be from the encoded signals for the second UE; in another frequency sub-band, two bits out of the six bits may be from the encoded signals for the first UE, and the remaining four bits may be from the encoded signals for the second UE; in still another frequency sub-band, the six bits may be from the encoded signals for three UEs respectively, with two bits for each UE.

After performing the joint modulation on the encoded signals for each UE in the above manner, the modulator 103 can send the modulated signals to the transmitter 104.

The transmitter 104 can receive the modulated signals. The transmitter 104 can perform various processes (e.g., an inverse fast Fourier transform, an addition of cyclic prefix, etc.), and then send the modulated signals to each UE.

It can be seen that, by using the above transmitting apparatus according to the embodiment of the present disclosure, a joint modulation can be performed on the encoded signals for a plurality of UEs, so that respective constellation points of the obtained constellation map of the modulated signals satisfy the Gray mapping rule, which may reduce the complexity of the decoding operation conducted in the UEs, as described hereinafter.

In this embodiment, in order that respective UEs receiving the modulated signals can demodulate the modulated signals, the transmitter 104 may further transmit control information for demodulating the modulated signals. The control information may be used to determine the number and positions (i.e., high significant bit, intermediate significant bit or low significant bit) of the bits of the encoded signals for the respective UEs that are mapped to the symbol corresponding to each constellation point of the constellation map of the modulated signals in the transmitting apparatus 100. The transmitter 104 may send the control information at a high frequency through a dynamic signaling (e.g., a physical downlink control channel (PDCCH)), or may send the control information at a low frequency through a semi-static signaling (e.g., a radio resource control (RRC) signaling), or may send the control information through a combination of the dynamic signaling and the semi-static signaling (e.g., a combination of the PDCCH and the RRC signaling) jointly.

In one implementation mode, the control information may include information indicating the MCS of each UE and information indicating the SIC order of each UE. As described above, the information indicating the MCS of each UE may be used to determine the number of bits of the encoded signals for the UE that are mapped to the symbol corresponding to each constellation point of the constellation map, and the information indicating the SIC order of each UE may be used to determine the positions of the bits of the encoded signals for the UE that are mapped to the symbol corresponding to each constellation point of the constellation map, which enables the UE to determine the number and positions of the bits of the encoded signals for each UE that are mapped to the symbol corresponding to each constellation point of the constellation map by using the control information, so as to perform demodulation and decoding. Since the existing NOMA system also sends the information indicating the MCS of each UE and the information indicating the SIC order of each UE, such an implementation mode may directly use the signaling of the existing NOMA system, without additional modifications to the signaling.

In another implementation mode, the control information may include information indicating the SIC order of each UE and information indicating the number of bits of the encoded signals for each UE that are mapped to the symbol corresponding to each constellation point of the constellation map. In this case, the UE may determine the positions of the bits of the encoded signals for each UE that are mapped to the symbol corresponding to each constellation point of the constellation map according to the information indicating the SIC order of each UE, and then directly determine the number of the bits of the encoded signals for each UE that are mapped to the symbol corresponding to each constellation point of the constellation map according to said number, so as to perform demodulation and decoding.

In still another implementation mode, the control information may include information indicating the number and positions of the bits of the encoded signals for each UE that are mapped to the symbol corresponding to each constellation point of the constellation map, which enables the UE to directly determine the number and positions according to the information, rather than determine the number and positions indirectly according to the MCS and the SIC order, thereby having a high efficiency.

Respective UEs receiving the modulated signals and the control information can demodulate and decode the modulated signals to recover the data bits sent by the base station. Specifically, according to the above mapping table or mapping relationship stored in advance, each UE may determine the constellation map of the modulated signals sent by the base station and the number of bits mapped to the symbol corresponding to each constellation point in a manner similar to that for describing the transmitting apparatus 100 hereinbefore. Then, each UE may demodulate the modulated signals to determine respective symbols, and may determine the number and positions of the bits of the encoded signals for itself that are mapped to the symbol corresponding to each constellation point of the constellation map according to the control information, so as to input the LLR of a determined number of bits at the determined position of each symbol into its own encoder to recover the bits sent by the base station to the UE. For example, in the case that each symbol of the modulated signals correspond to six bits and it is determined according to the control information that the first four bits are for $UE_1$ while the last two bits are for $UE_2$, $UE_1$ may input the LLR of the first four bits into its own decoder, and $UE_2$ may input the LLR of the last two bits into its own decoder. It should be noted that for the regular or irregular constellation map, the UEs can demodulate it in the ways known in the art, where for the irregular constellation map, the UEs can, for example, perform demodulation in the way as described by M. SurendraRaju, A. Ramesh, A. Chockalingam, in "BER analysis of QAM with transmit diversity in Rayleigh fading channels", *Global Telecommunications Conference,* 2003, p. 641-645.

It can be seen that, with the joint modulation conducted in the transmitting apparatus, it does not need to perform decoding in the UE according to the SIC order of each UE, i.e., after LLR of each bit is calculated, the LLRs of the bits corresponding to respective UEs may be sent to the decoders of the UEs to perform channel decoding, without operation of interference cancellation. This reduces the complexity of decoding, thereby greatly reducing the complexity of the receiver (e.g., UE), and meanwhile the performance of the receiver is same or close to that of a conventional receiver that performs interference cancellation.

Hereinafter, a transmitting method according to an embodiment of the present disclosure will be described with reference to FIG. 12. This method may be carried out by, for example, the above transmitting apparatus, where the transmitting apparatus may be located in a base station or controlled by the base station.

As described above, the base station may schedule a plurality of UEs for each frequency sub-band before carrying out the transmitting method, to determine data for which UEs are multiplexed to the frequency sub-band. For example, the base station may perform the above scheduling for respective UEs according to the CSI fed back by each UE. In addition, based on the CSI fed back by each UE, the base station may also determine a demodulation order (i.e., a successive interference cancellation (SIC) order of the respective UEs) of the data for the respective UEs that are multiplexed in each frequency sub-band, and powers and MCSs assigned to the respective UEs.

Figure 12:
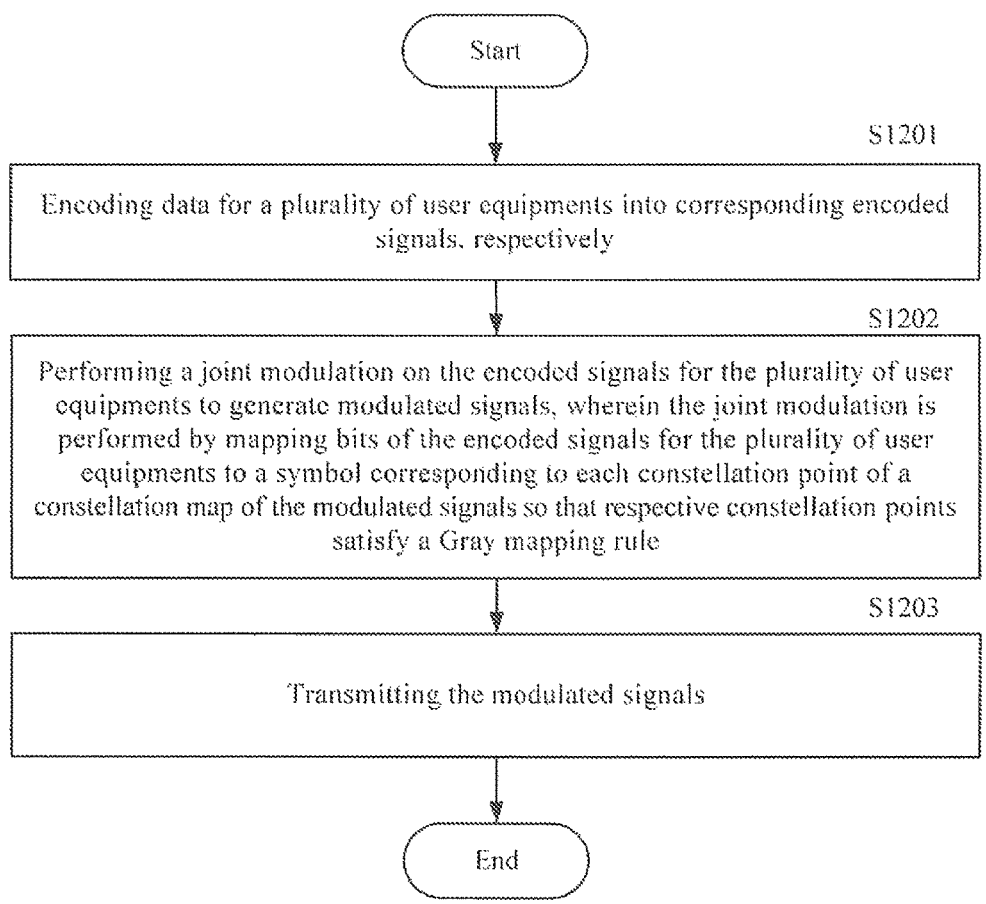
FIG. 12 illustrates a flow chat of a transmitting method according to an embodiment of the present disclosure.

Referring to FIG. 12, in step S1201, the data for the plurality of UEs can be encoded into corresponding encoded signals, respectively. For example, the data for the respective UEs can be encoded according to the MCSs assigned to the respective UEs by using an encoding method known in the art, to generate encoded signals for the respective UEs.

In step S1202, a joint modulation may be performed on the encoded signals for the plurality of UEs to generate modulated signals. In the embodiment of the present disclosure, the joint modulation may be performed by mapping bits of the encoded signals for the plurality of UEs to a symbol corresponding to each constellation point of a constellation map of the modulated signals, so that respective constellation points of the constellation map satisfy the Gray mapping rule.

Specifically, the number of the bits of the encoded signals for the UE that are mapped to the symbol corresponding to each constellation point of the constellation map of the modulated signals may be determined according to the MCS assigned to each UE in the manner as described above; then, the position of each constellation point of the constellation map of the modulated signals may be determined according to the powers assigned to the plurality of UEs and the above numbers of bits (i.e., the numbers of bits of the encoded signals for respective UEs that are mapped to the symbol corresponding to each constellation point of the constellation map of the modulated signals).

After the positions of respective constellation points of the constellation map of the modulated signals are determined, the bits of the encoded signals for the plurality of UEs are mapped to the symbol corresponding to each constellation point such that the respective constellation points of the constellation map satisfy the Gray mapping rule. In this embodiment, in the case that only the data for two UEs are multiplexed, bits of the encoded signals of a UE on an edge of a cell may be mapped to high significant bits of a symbol corresponding to each constellation point, and bits of the encoded signals of UE in a center of the cell may be mapped to low significant bits of the symbol. In the case that the data for more than two UEs are multiplexed, the bits of the encoded signals for respective UEs can be mapped to the symbol in a descending order of the powers assigned to the UEs (i.e., the order opposite to the SIC order of the respective UEs) starting from the high significant bit of the symbol corresponding to each constellation point.

In the embodiment of the present disclosure, the above mapping of the bits to the symbol may be carried out in many ways. In a first mapping manner, the bits of the encoded signals for the plurality of UEs may be mapped to a symbol corresponding to each constellation point of the constellation map according to a mapping table indicating a mapping relationship between the bits of the encoded signals for the plurality of UEs and the symbol corresponding to each constellation point of the constellation map. The mapping table may be predefined and stored in the base station and each UE. Among the bits of each unit grid in the mapping table, the bits of the encoded signal for the UE on the edge of the cell may be located in the high significant bits, while the bits of the encoded signal for the UE in the center of the cell may be located in the low significant bits.

In a second mapping manner, the mapping table may not be set, but the bits of the encoded signals for the plurality of UEs can be directly mapped to the symbol corresponding to each constellation point of a constellation map according to a mapping manner both known to the base station and each UE, so that respective constellation points satisfy the Gray mapping rule.

In a third mapping manner, for the symbol corresponding to each constellation point of the constellation map, the bits of the encoded signals for the UE on the edge of the cell that are mapped to the symbol can be determined, and then the bits of the encoded signals for the UE in the center of the cell that are mapped to the symbol can be determined according to the bits of the encoded signals for the UE on the edge of the cell that are mapped to the symbol. In other words, the bits of the encoded signals for respective UEs may be mapped to the symbol corresponding to each constellation point in sequence in a descending order of the powers assigned to the UEs (i.e., the order opposite to the SIC order of respective UEs), the bits of the encoded signals of the UE to which a high power is assigned are mapped to the high significant bits of the symbol, while the bits of the encoded signals of the UE to which a low power is assigned are mapped to the low significant bits of the symbol.

In the above manners, a joint modulation can be performed on the encoded signals for the plurality of UEs, and respective constellation points of the obtained constellation map of the modulated signals are made to satisfy the Gray mapping rule.

As described above, in a case that there are a plurality of frequency sub-bands, the above operation is performed on each frequency sub-band so as to perform the above joint modulation on the data of the UE multiplexed to the frequency sub-band. In this case, for different frequency sub-bands, the numbers of bits for the same UE that are mapped to the symbol corresponding to each constellation point of the obtained constellation map of the modulated signals corresponding to the frequency sub-bands may be same or different. In addition, since the numbers of multiplexed UEs in different frequency sub-bands may be same or different, the generated constellation maps of modulated signals for different frequency sub-bands may be same or different.

With further reference to FIG. 12, in step S1203, the modulated signals can be transmitted after undergoing various processes.

It can be seen that, by using the above transmitting method according to the embodiment of the present disclosure, a joint modulation can be performed on the encoded signals for a plurality of UEs so that respective constellation points of the obtained constellation map of the modulated signals satisfy the Gray mapping rule, which may reduce the complexity of the decoding operation conducted in the receiver (e.g., UE), thus reducing the complexity of the receiver.

In this embodiment, in order that respective UEs receiving the modulated signals can demodulate the modulated signals, control information for demodulating the modulated signals may be further transmitted. The control information may be used to determine the number and positions of the bits of the encoded signals for respective UEs that are mapped to the symbol corresponding to each constellation point of the constellation map of the modulated signals in the transmitting apparatus 100. The transmitter 104 may send the control information at a high frequency through a dynamic signaling (e.g., a physical downlink control channel (PDCCH)), or may send the control information at a low frequency through a semi-static signaling (e.g., a radio resource control (RRC) signaling), or may send the control information through a combination of the dynamic signaling and the semi-static signaling (e.g., a combination of the PDCCH and the RRC signaling) jointly.

As described above, in one implementation mode, the control information may include information indicating the MCS of each UE and information indicating the SIC order of each UE. The information indicating the MCS of each UE may be used to determine the number of bits of the encoded signals for the UE that are mapped to the symbol corresponding to each constellation point of the constellation map, and the information indicating the SIC order of each UE may be used to determine the positions of the bits of the encoded signals for the UE that are mapped to the symbol corresponding to each constellation point of the constellation map. In another implementation mode, the control information may include information indicating the SIC order of each UE and information indicating the number of bits of the encoded signals for each UE that are mapped to the symbol corresponding to each constellation point of the constellation map. In still another implementation mode, the control information may include information indicating the number and positions of the bits of the encoded signals for each UE that are mapped to the symbol corresponding to each constellation point of the constellation map.

Respective UEs receiving the modulated signals and control information can demodulate and decode the modulated signals in the manner described above, to recover the data bits sent by the transmitting apparatus (base station). Since the manners for demodulating and decoding have been described hereinabove, they will not be repeated here. As described above, it is not necessary to perform interference cancellation operation when decoding in the receiver (e.g., UE), which greatly reduces the complexity the receiver, and meanwhile the performance of the receiver is same as or close to that of a conventional receiver that performs interference cancellation.

The transmitting apparatus and the transmitting method according to the embodiments of the present disclosure have been descried hereinabove. It should be appreciated that these embodiments are only illustrative, rather than limitative. For example, although the successive interference cancellation order of respective UEs is mentioned above, this is not limitative, and the interference cancellation order of the respective UEs may also be used to replace the successive interference cancellation order. In addition, although some manners of mapping bits to symbols have been provided above, these mapping manners are only illustrative, and other mapping manners can also be used, as long as respective constellation points of the finally obtained constellation map of the modulated signals satisfy the Gray mapping rule.

The exemplary embodiments of the present disclosure have been shown and described, but a person skilled in the art should appreciate that various changes in forms and details may be made to these exemplary embodiments without departing from the scope and spirit of the present disclosure as defined in the claims and equivalents thereof.

What is claimed is:

1. A transmitting apparatus, comprising:
   an encoder, configured to encode data for a plurality of user equipments into corresponding encoded signals, respectively;
   a modulator, configured to perform a joint modulation on the encoded signals for the plurality of user equipments to generate modulated signals, where the modulator performs the joint modulation by mapping bits of the encoded signals for the plurality of user equipments to a symbol corresponding to each constellation point of a constellation map of the modulated signals so that respective constellation points of the constellation map satisfy a Gray mapping rule; and
   a transmitter, configured to transmit the modulated signals,
   wherein the modulator determines a number of the bits of the encoded signals for each user equipment that are mapped to the symbol corresponding to each constellation point of the constellation map of the modulated signals generated by the joint modulation according to a modulation and coding scheme assigned to each user equipment, and then determines a total number of the bits mapped to the symbol corresponding to each constellation point of the constellation map of the modulated signals generated by the joint modulation according to the number of the bits of the encoded signals for the respective user equipments;

wherein a number of bits of the encoded signals for a same user equipment that are mapped to the symbol corresponding to each constellation point of the constellation map of the modulated signals is based at least in part on the particular frequency sub-bands used for the modulated signals.

2. The transmitting apparatus according to claim 1, wherein the modulator maps bits of encoded signals for a user equipment on an edge of a cell to high significant bits of a symbol corresponding to each constellation point and maps bits of encoded signals for a user equipment in a center of the cell to low significant bits of the symbol.

3. The transmitting apparatus according to claim 1, where the modulator determines positions of respective constellation points of the constellation map of the modulated signals according to respective powers and numbers of bits assigned to the plurality of user equipments.

4. The transmitting apparatus according to claim 1, where the transmitter is further configured to transmit control information for demodulating the modulated signals.

5. The transmitting apparatus according to claim 4, where the control information includes information indicating the modulation and coding scheme of each user equipment and information indicating an interference cancellation order of each user equipment, the information indicating the modulation and coding scheme of each user equipment is used to determine the number of the bits of the encoded signals for the user equipment that are mapped to the symbol corresponding to each constellation point of the constellation map, and the information indicating the interference cancellation order of each user equipment is used to determine positions of the bits of the encoded signals for the user equipment that are mapped to the symbol corresponding to each constellation point of the constellation map.

6. The transmitting apparatus according to claim 4, where the control information includes information indicating the interference cancellation order of each user equipment and information indicating the number of bits of the encoded signals for each user equipment that are mapped to the symbol corresponding to each constellation point of the constellation map, the information indicating the interference cancellation order of each user equipment is used to determine the positions of the bits of the encoded signals for the user equipment that are mapped to the symbol corresponding to each constellation point of the constellation map.

7. The transmitting apparatus according to claim 4, where the control information includes information indicating the number and positions of the bits of the encoded signals for each user equipment that are mapped to the symbol corresponding to each constellation point of the constellation map.

8. The transmitting apparatus according to claim 4, where the transmitter transmits the control information through a physical downlink control channel and/or a wireless resource control signaling.

9. A transmitting method, comprising steps of:
encoding data for a plurality of user equipments into corresponding encoded signals, respectively;
performing a joint modulation on the encoded signals for the plurality of user equipments to generate modulated signals, wherein the joint modulation is performed by mapping bits of the encoded signals for the plurality of user equipments to a symbol corresponding to each constellation point of a constellation map of the modulated signals so that respective constellation points of the constellation map satisfy a Gray mapping rule; and
transmitting the modulated signals,
wherein a number of the bits of the encoded signals for each user equipment that are mapped to the symbol corresponding to each constellation point of the constellation map of the modulated signals generated by the joint modulation is determined according to a modulation and coding scheme assigned to each user equipment, and then a total number of the bits mapped to the symbol corresponding to each constellation point of the constellation map of the modulated signals generated by the joint modulation is determined according to the number of the bits of the encoded signals for the respective user equipments;
wherein a number of bits of the encoded signals for a same user equipment that are mapped to the symbol corresponding to each constellation point of the constellation map of the modulated signals is based at least in part on the particular frequency sub-bands used for the modulated signals.

10. The transmitting method according to claim 9, where bits of encoded signals for a user equipment on an edge of a cell are mapped to high significant bits of a symbol corresponding to each constellation point, and bits of encoded signals for a user equipment in a center of the cell are mapped to low significant bits of the symbol.

11. The transmitting method according to claim 9, where positions of respective constellation points of the constellation map of the modulated signals are determined according to respective powers and numbers of bits assigned to the plurality of user equipments.

12. The transmitting method according to claim 9, further comprising:
transmitting control information for demodulating the modulated signals.

13. The transmitting method according to claim 12, where the control information includes information indicating the modulation and coding scheme of each user equipment and information indicating an interference cancellation order of each user equipment, the information indicating the modulation and coding scheme of each user equipment is used to determine the number of bits of the encoded signals for the user equipment that are mapped to the symbol corresponding to each constellation point of the constellation map, and the information indicating the interference cancellation order of each user equipment is used to determine positions of the bits of the encoded signals for the user equipment that are mapped to the symbol corresponding to each constellation point of the constellation map.

14. The transmitting method according to claim 12, where the control information includes information indicating the interference cancellation order of each user equipment and information indicating the number of bits of the encoded signals for each user equipment that are mapped to the symbol corresponding to each constellation point of the constellation map, the information indicating the interference cancellation order of each user equipment is used to determine the positions of the bits of the encoded signals for the user equipment that are mapped to the symbol corresponding to each constellation point of the constellation map.

15. The transmitting method according to claim 12, where the control information includes information indicating the number and positions of the bits of the encoded signals for each user equipment that are mapped to the symbol corresponding to each constellation point of the constellation map.

16. The transmitting method according to claim 12, where the control information is transmitted through a physical downlink control channel and/or a wireless resource control signaling.

* * * * *